(12) United States Patent
H V et al.

(10) Patent No.: US 12,476,838 B1
(45) Date of Patent: Nov. 18, 2025

(54) SYNCHRONIZING COMMUNICATION APPLICATIONS BETWEEN INFORMATION HANDLING SYSTEMS

(71) Applicant: Dell Products L.P., Round Rock, TX (US)

(72) Inventors: Ramanaa H V, Bangalore (IN); Gokul Thiruchengode Vajravel, Bangalore (IN); Srinivasa Ragavan Rajagopalan, Bangalore (IN); Jyothi Bandakka Nanjappa, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 3 days.

(21) Appl. No.: 18/663,430

(22) Filed: May 14, 2024

(51) Int. Cl.
*H04L 12/18* (2006.01)

(52) U.S. Cl.
CPC ...... *H04L 12/1818* (2013.01); *H04L 12/1822* (2013.01)

(58) Field of Classification Search
None
See application file for complete search history.

(56) References Cited

U.S. PATENT DOCUMENTS

| | | | | |
|---|---|---|---|---|
| 8,963,693 B2 * | 2/2015 | Lo | ............ | G08C 17/02 340/10.5 |
| 10,069,774 B2 * | 9/2018 | Hattar | ............ | H04L 65/4015 |
| 12,057,954 B2 * | 8/2024 | Nagesh | ............ | H04L 12/1822 |
| 2007/0201673 A1 * | 8/2007 | Annadata | ............ | H04M 3/5235 379/265.01 |
| 2011/0304686 A1 * | 12/2011 | Qiu | ............ | G06Q 10/00 348/14.08 |
| 2012/0098921 A1 * | 4/2012 | Stedman | ............ | H04N 7/15 348/E7.083 |
| 2014/0282619 A1 * | 9/2014 | Michie | ............ | H04L 67/02 719/318 |

(Continued)

FOREIGN PATENT DOCUMENTS

| | | | | |
|---|---|---|---|---|
| EP | 4456516 A2 * | 10/2024 | ........ | H04L 65/1069 |
| WO | WO-2019217019 A1 * | 11/2019 | ........... | G06F 3/0482 |

*Primary Examiner* — Phyllis A Book
(74) *Attorney, Agent, or Firm* — McDermott Will & Schulte LLP

(57) ABSTRACT

Synchronizing communication applications, including registering a first instance of a first communication application of a first IHS with a first local communication management computing module of the first IHS; registering a first instance of a second communication application of the first IHS with the first local communication management module; monitoring a status of each of the first instance of the first communication application and the first instance of the second communication application, including: receiving a notification indicating a meeting event associated with the first instance of the first communication application; in response to receiving the notification: accessing a database that indicates, for each communication application, computer-implemented actions that are responsive to the notification of the meeting event; identifying a particular computer-implemented action; performing the particular computer-implemented action at the first instance of the second communication application including updating a state of the first instance of the second communication application.

20 Claims, 4 Drawing Sheets

(56) References Cited

U.S. PATENT DOCUMENTS

| | | | | |
|---|---|---|---|---|
| 2021/0328948 | A1* | 10/2021 | Bax | H04L 51/212 |
| 2022/0124124 | A1* | 4/2022 | Cirker | H04L 65/403 |
| 2022/0417284 | A1* | 12/2022 | Hamlin | G06F 21/33 |
| 2023/0041678 | A1* | 2/2023 | Swierk | G06F 21/16 |
| 2023/0045610 | A1* | 2/2023 | Iyer | H04L 65/1083 |
| 2023/0048072 | A1* | 2/2023 | Bakshi | H04M 1/72451 |
| 2023/0091626 | A1* | 3/2023 | Alvarado | G06F 3/0481 |
| | | | | 715/733 |
| 2023/0112219 | A1* | 4/2023 | Robbins | G06F 11/1433 |
| | | | | 717/168 |
| 2025/0048220 | A1* | 2/2025 | Pateromichelakis | H04W 36/32 |

* cited by examiner

SYNCHRONIZING COMMUNICATION APPLICATIONS BETWEEN INFORMATION HANDLING SYSTEMS

BACKGROUND

Field of the Disclosure

The disclosure relates generally to synchronizing communication applications within an information handling system, and synchronizing communication applications between information handling systems.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Video teleconference (VTC) applications on computers facilitate audio, video, and graphics communication between participants. These programs, often used for virtual meetings and collaboration, can range from simple instant messaging and file-sharing to more robust platforms. The VTC applications can integrate chat, video calls, document collaboration, screen sharing, breakout rooms, and virtual backgrounds.

SUMMARY

Innovative aspects of the subject matter described in this specification may be embodied in a method of synchronizing communication applications, including registering a first instance of a first communication application of a first information handling system with a first local communication management computing module of the first information handling system, the first instance of the first communication application enabling communication between the first information handling system and other information handling systems; registering a first instance of a second communication application of the first information handling system with the first local communication management module, the first instance of the second communication application enabling communication between the first information handling system and other information handling systems; monitoring, by the local central communication management module, a status of each of the first instance of the first communication application and the first instance of the second communication application, including: receiving, from the first instance of the first communication application and at a first time, a notification indicating a meeting event associated with the first instance of the first communication application; in response to receiving the notification: accessing a database that indicates, for each communication application of a plurality of communication applications, one or more computer-implemented actions that are responsive to the notification of the meeting event; identifying, from the database and for the second communication application, a particular computer-implemented action; and performing the particular computer-implemented action at the first instance of the second communication application including updating a state of the first instance of the second communication application.

Other embodiments of these aspects include corresponding systems, apparatus, and computer programs, configured to perform the actions of the methods, encoded on computer storage devices.

These and other embodiments may each optionally include one or more of the following features. For instance, performing the particular computer-implemented action further includes updating a status of the first instance of the second communication application, the status including one or more of available, away, busy, do not disturb, offline, in a calendar event, presenting, or on a call. Performing the particular computer-implemented action further includes disconnecting a communication request at the first instance of the second communication application. Receiving, from the first instance of the first communication application and at a second time after the first time, an additional notification indicating a cessation of the meeting event associated with the first instance of the first communication application; and in response to receiving the additional notification, updating the status of the first instance of the second communication to a nominal state. Registering a second instance of the second communication application of a second information handling system with a second local communication management module at the second information handling system, the second instance of the second communication application enabling communication between the second information handling system and other information handling systems; receiving, at a central communication management computing module of a central information handling system that is in communication with the first information handling system and the second information handling system and from the first information handling system, the notification; in response to receiving the notification: providing, by the central information handling system and to the second information handling system, the particular computer-implemented action; and performing, by the second local communication management module at the second information handling system, the particular computer-implemented action at the second instance of the second communication application including updating a state of the second instance of the second communication application. In response to receiving the notification: accessing the database that further indicates, for other applications, one or more additional computer-implemented actions that are responsive to the notification of the meeting event; identifying, from the database and for an other application currently executing in the foreground of the first information handling system, an additional computer-implemented action; and performing the additional computer-implemented action at the other application. The other application currently executing in the foreground of the first information handling system is a video-based application, wherein performing the additional computer-implemented action at the other application includes pausing the video-based application.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

Figure 1:
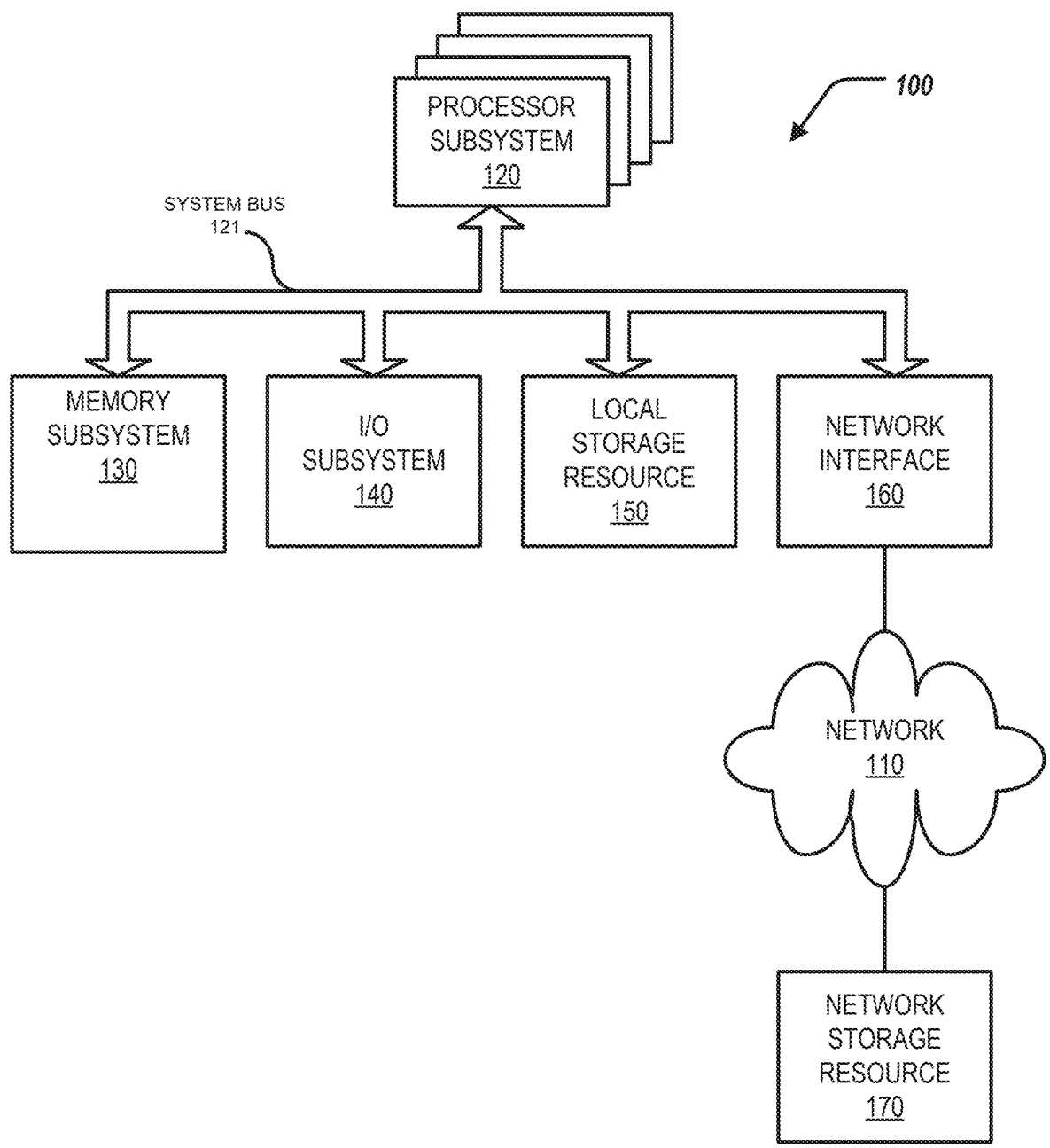
FIG. 1 is a block diagram of selected elements of an embodiment of an information handling system.

This disclosure discusses methods and systems for synchronizing communication applications within an information handling system, and between information handling systems. In short, a status of the communication applications can be synchronized within the same information handling system, and across information handling systems. As a result, predefined actions can be taken based on triggers to improve the user experience of using multiple communication applications across multiple information handling systems, described further herein.

Specifically, this disclosure discusses a system and a method for synchronizing communication applications, including registering a first instance of a first communication application of a first information handling system with a first local communication management computing module of the first information handling system, the first instance of the first communication application enabling communication between the first information handling system and other information handling systems; registering a first instance of a second communication application of the first information handling system with the first local communication management module, the first instance of the second communication application enabling communication between the first information handling system and other information handling systems; monitoring, by the local central communication management module, a status of each of the first instance of the first communication application and the first instance of the second communication application, including: receiving, from the first instance of the first communication application and at a first time, a notification indicating a meeting event associated with the first instance of the first communication application; in response to receiving the notification: accessing a database that indicates, for each communication application of a plurality of communication applications, one or more computer-implemented actions that are responsive to the notification of the meeting event; identifying, from the database and for the second communication application, a particular computer-implemented action; performing the particular computer-implemented action at the first instance of the second communication application including updating a state of the first instance of the second communication application.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such as wires, optical fibers, microwaves, radio waves, and other electromagnetic and/or optical carriers; and/or any combination of the foregoing.

Particular embodiments are best understood by reference to FIGS. 1-4 wherein like numbers are used to indicate like and corresponding parts.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include one or more processing resources such as a central processing unit (CPU), microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of an information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, a camera, or another type of peripheral device.

Local storage resource 150 may comprise computer-readable media (e.g., hard disk drive, floppy disk drive, CD-ROM, and/or other types of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other types of rotating storage media, flash memory, EEPROM, and/or other types of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g., corporate) network. The network may be implemented as, or may be a part of, a storage area network (SAN), a personal area network (PAN), a local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g., customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet, or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

Figure 2:
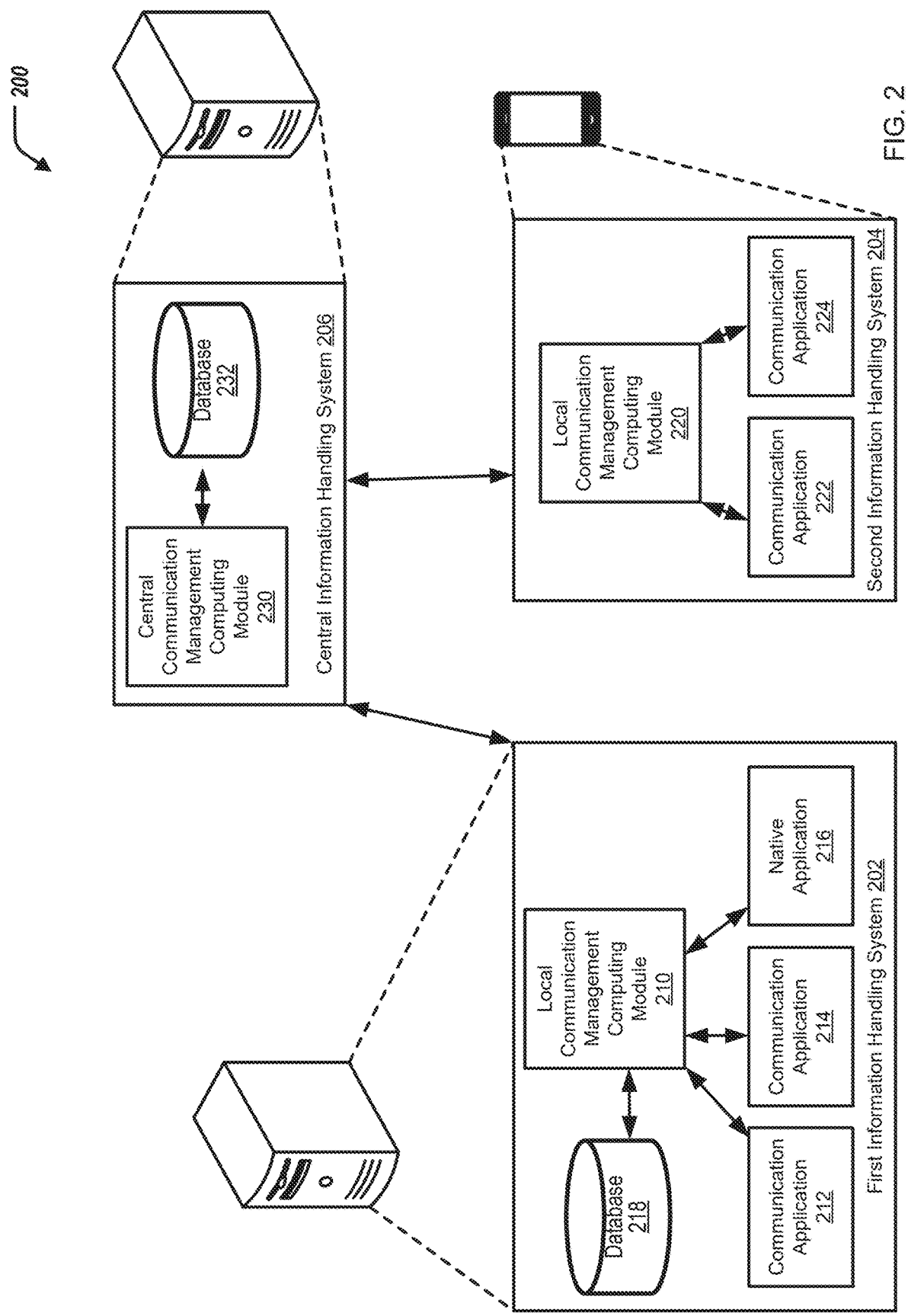
FIG. 2 illustrates a block diagram of a computing environment for synchronizing communication applications within an information handling system, and between information handling systems.

Turning to FIG. 2, FIG. 2 illustrates an environment 200 including a first information handling system 202, a second information handling system 204, and a central information handling system 206.

The first information handling system 202 can include a first local communication management computing module 210, a first instance of a first communication application 212, a first instance of a second communication application 214, a native application 216, and a database (storage device) 218. In some examples, the first information handling system 202 is similar to, or includes, the information handling system 100 of FIG. 1.

The first instance of the first communication application 212 can enable communication between the first information handling system 202 and other information handling systems connected to the first information handling system 202 through a network (e.g., the Internet). Specifically, the first instance of the first communication application 212 can enable communication between the first information handling system 202 and other information handling systems connected to the first information handling system 202 though other instances of the first communication application located at respective other information handling systems.

The first instance of the second communication application 214 can enable communication between the first information handling system 202 and other information handling systems connected to the first information handling system 202 through a network (e.g., the Internet). Specifically, the first instance of the second communication application 214 can enable communication between the first information handling system 202 and other information handling systems connected to the first information handling system 202 though other instances of the second communication application located at respective other information handling systems.

The second information handling system 204 can include a second local communication management computing module 220, a second instance of the first communication application 222, and a second instance of the second communication application 224. In some examples, the second information handling system 204 is similar to, or includes, the information handling system 100 of FIG. 1.

The second instance of the first communication application 222 can enable communication between the second information handling system 204 and other information handling systems connected to the second information handling system 204 through a network (e.g., the Internet). Specifically, the second instance of the first communication application 222 can enable communication between the second information handling system 204 and other information handling systems connected to the second information handling system 204 though other instances of the first communication application located at respective other information handling systems.

The second instance of the second communication application 224 can enable communication between the second information handling system 204 and other information handling systems connected to the second information handling system 204 through a network (e.g., the Internet). Specifically, the second instance of the second communication application 224 can enable communication between the second information handling system 204 and other information handling systems connected to the second information handling system 204 though other instances of the second communication application located at respective other information handling systems.

The central information handling system 206 can include a central communication management computing module 230 and a database 232 (or storage device 232). In some examples, the central information handling system 206 is similar to, or includes, the information handling system 100 of FIG. 1.

The central information handling system 206 can be in communication with the first information handling system 202 and the second information handling system 204.

In short, a status of the communication applications can be synchronized within the same information handling system, and across information handling systems. As a result, predefined actions can be taken based on triggers to improve the user experience of using multiple communication applications across multiple information handling systems, described further herein.

Figure 3:
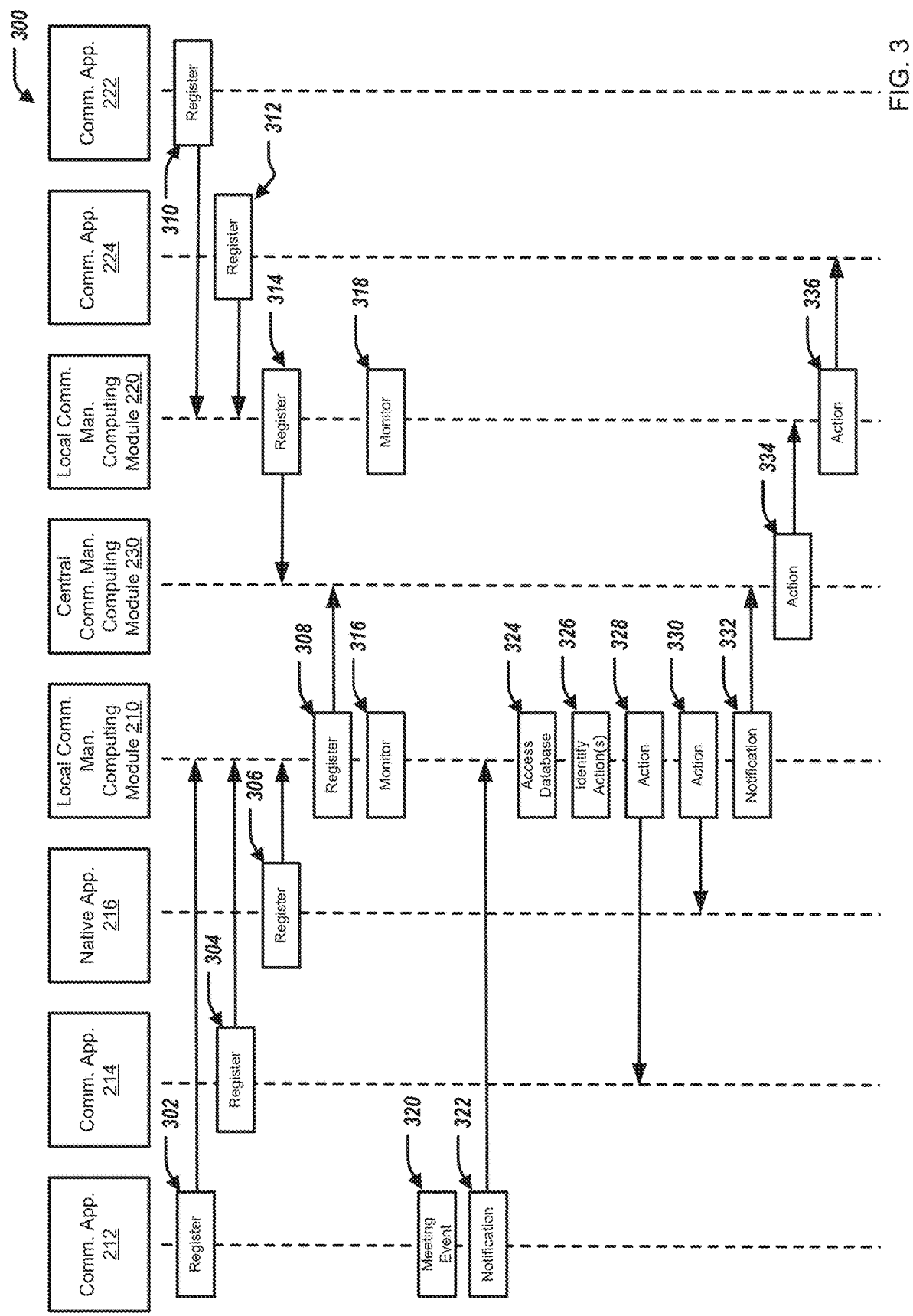
FIG. 3 illustrates a swim-lane diagram for synchronizing communication applications within an information handling system, and between information handling systems.

FIG. 3 illustrates a swim-lane diagram depicting selected elements of an embodiment of a method 300 for synchronizing communication applications within an information handling system, and between information handling systems. The method 300 may be performed by the information handling system 100, the first information handling system 202, the second information handling system 204, and/or the central information handling system 206, and with reference to FIGS. 1-2. It is noted that certain operations described in method 300 may be optional or may be rearranged in different embodiments.

The first instance of the first communication application 212 registers with the first local communication management computing module 210, at 302. In some examples, the first instance of the first communication application 212 registers with the first local communication management computing module 210 by providing identifying information of the first instance of the first communication application 212 to the first local communication management computing module 210.

The first instance of the second communication application 214 registers with the first local communication management computing module 210, at 304. In some examples, the first instance of the second communication application 214 registers with the first local communication management computing module 210 by providing identifying information of the first instance of the second communication application 214 to the first local communication management computing module 210.

In some examples, the first instance of the second communication application 214 can register at the first local communication management computing module 210 concurrently (or substantially concurrently) and/or simultaneously (or substantially simultaneously) as the first instance of the first communication application 212 registers with the first local communication management computing module 210.

The native application 216 registers with the first local communication management computing module 210, at 306. In some examples, the native application 216 registers with the first local communication management computing module 210 by providing identifying information of the native application 216 to the first local communication management computing module 210.

The first local communication management computing module 210 registers with the central communication management computing module 230, at 308. In some examples, the first local communication management community module 210 registers with the central communication management computing module 230 by providing identifying information of the first local communication management computing module 210 and/or identifying information of the first information handling system 202.

The second instance of the first communication application 222 registers with the second local communication management computing module 220, at 310. In some examples, the second instance of the first communication application 222 registers with the second local communication management computing module 220 by providing identifying information of the second instance of the first communication application 222 to the second local communication management computing module 220.

The second instance of the second communication application 224 registers with the second local communication management computing module 210, at 312. In some examples, the second instance of the second communication application 224 registers with the second local communication management computing module 220 by providing identifying information of the second instance of the second communication application 224 to the second local communication management computing module 220.

In some examples, the second instance of the second communication application 224 can register at the second local communication management computing module 220 concurrently (or substantially concurrently) and/or simultaneously (or substantially simultaneously) as the second instance of the first communication application 222 registers with the second local communication management computing module 220.

In some examples, the second instance of the second communication application 224 and the second instance of the first communication application 222 can register at the second local communication management computing module 220 concurrently (or substantially concurrently) and/or simultaneously (or substantially simultaneously) as the first instance of the first communication application 212 and the first instance of the second communication application 214 registers with the first local communication management computing module 210.

The second local communication management computing module 220 registers with the central communication management computing module 230, at 314. In some examples, the second local communication management community module 220 registers with the central communication management computing module 230 by providing identifying information of the second local communication management computing module 220 and/or identifying information of the second information handling system 204.

In some examples, the second local communication management computing module 220 can register at the central communication management computing module 230 concurrently (or substantially concurrently) and/or simultaneously (or substantially simultaneously) as the first local communication management module 210 registers with the central communication management module 230.

The first local communication management computing module 210 monitors a status of the first instance of the first communication application 212 and a status of the first instance of the second communication application 214, at 316. In some examples, the first local communication management module 210 monitors a status of the first instance of the first communication application 212 and the status of the first instance of the second communication application 214 based on SDK/API of the first instance of the first communication application 212 and the first instance of the second communication application 214.

The second local communication management module 220 monitors a status of the second instance of the first communication application 222 and a status of the second instance of the second communication application 224, at 318. In some examples, the second local communication management module 220 monitors a status of the second instance of the first communication application 222 and the status of the second instance of the second communication application 224 based on SDK/API of the second instance of the first communication application 222 and the second instance of the second communication application 224.

A meeting event can occur at the first instance of the first communication application 212, at 320. Specifically, initiation of the meeting event can occur at the first instance of the first communication application 212. The meeting event can include a communication session with another party (e.g., another instance of the first communication application at another information handling system). The communication session can include a teleconference or a video teleconference meeting event.

The first instance of the first communication application 212 can provide a notification to the first local communication management module 210, at 322. Specifically, the first instance of the first communication application 212 can provide the notification to the first local communication management module 210 indicating the meeting event associated with the first instance of the first communication application 212. The first local communication management computing module 210 can receive the notification from the first communication application 212.

The first local communication management computing module 210, in response to receiving the notification, accesses a database, at 324. Specifically, the first local communication management computing module 210 accesses the database 218 that indicates, for each communication application (of a plurality of communication applications), computer-implemented actions that are responsive to the notification of the meeting event. For example, such computer-implemented actions can include updating a state of other communication applications at the first information handling systems 202, including setting a status of the other communication applications and/or restricting/allowing/adjusting capabilities of the other communication applications. For example, the computer-implemented actions related to updating a state of other communication applications at the first information handling systems 202 can include updating a status of the first instance of the second communication application 214 (e.g., a status of a user of the first instance of the second communication application 214). For example, the status of the first instance of the second communication application 214 can include one or more of available, away, busy, do not disturb, offline, in a calendar event, presenting, or on a call. For example, such computer-implemented actions can include disconnecting a communication request at the first instance of the second communication application 214. For example, disconnecting the communication request at the first instance of the second communication application 214 can include denying, sending to a messaging protocol, delaying, or otherwise preventing communication utilizing the first instance of the second communication application 214.

The first local communication management computing module 210, further in response to receiving the notification, identifies, from the database 218, computer-implemented actions, at 326. Specifically, the first local communication management computing module 210 identifies, from the database 218, a particular computer-implemented action that is associated with (corresponding with) the second communication application. For example, the first local communication management computing module 210 can identify, from the database 218, a particular computer-implemented action of updating a state for the second communication application in view of the notification, including setting the status of the second communication application to a "busy" status.

The first local communication management computing module 210, further in response to receiving the notification, can perform the particular computer-implemented action at the first instance of the second communication application 214, at 328. Specifically, the first local communication management computing module 210 performs the particular computer-implemented action at the first instance of the second communication application 214, including updating the state of the first instance of the second communication application 214. For example, the first local communication management computing module 210 updates the state for the second communication application in view of the notification, including setting the status of the first instance of the second communication application 214 to a "busy" status.

In a use case example, a user of the first information handling system 202 can be engaged with the first instance of the first communication application 212—e.g., in a meeting utilizing the first instance of the first communication application 212. The first local communication management computing module 210 can facilitate updating the status of the first instance of the second communication application 214 to a "busy" status in response to engagement by the user with the first instance of the first communication application 212. Further, the user can receive a communication request via the first instance of the second communication application 214 while in the meeting. The first local communication management computing module 210 can facilitate disconnecting/denying the communication request at the first instance of the second communication application 214.

In some examples, the first local communication management computing module 210, further in response to receiving the notification, accesses the database 218 that indicates, for the native application 216, additional computer-implemented actions that are responsive to the notification of the meeting event (at 324). The first local communication management computing module 210, identifies, from the database 218, an additional particular computer-implemented action that is associated with (corresponding with) the native application 216 that is executing in the foreground of the first information handling system 202 (at 326). The first local communication management computing module 210 can perform the additional particular computer-implemented action at the native application 216, at 330.

For example, the native application 216 can include a video-based application that is executing in a foreground (e.g., of a display) of the first information handling system 202. The video-based application can be, for example, a video game or a video (movie). The additional particular computer-implemented action can include pausing the video-based application. That is, the first local communication management computing module 210, further in response to receiving the notification, accesses the database 218 and identifies, from the database 218, an additional particular computer-implemented action that pauses the video-based application. The first local communication management computing module 210 can perform the additional particular computer-implemented action of pausing the native application 216.

In a use case example, a user of the first information handling system 202 can be engaged with the native application—e.g., watching a movie. The user can receive a communication request via the first instance of the first communication application 212 while engaged with the native application 216. The first local communication management computing module 210 can facilitate pausing the native application 216 (pause the movie) and facilitate a connection via the first instance of the first communication application 212.

In some further examples, the first local communication management computing module 210 can provide a notification to the central communication management computing module 230, at 332. Specifically, the first local communication management computing module 210 can forward the notification from the first instance of the first communication application 212 indicating the meeting event associated with the first instance of the first communication application 212 to the central communication management computing module 230. The central communication management computing module 230 can receive the notification from the first local communication management computing module 210.

In some examples, the central communication management computing module 230, in response to receiving the notification, accesses a database. Specifically, the central communication management computing module 230 accesses the database 232 (or storage device 232) that indicates, for each communication application (of a plurality of communication applications), computer-implemented actions that are responsive to the notification of the meeting event. For example, such computer-implemented actions can include updating a state of other communication applications at the first information handling system 202 and/or the second information handling system 204, including setting a status of the other communication applications and/or restricting/allowing/adjusting capabilities of the other communication applications. For example, the computer-implemented actions related to updating a state of other communication applications at the first information handling systems 202 and/or the second information handling system can include updating a status of the second instance of the second communication application 224 (e.g., a status of a user of the second instance of the second communication application 224). For example, the status of the second instance of the second communication application 224 can include one or more of available, away, busy, do not disturb, offline, in a calendar event, presenting, or on a call. For example, such computer-implemented actions can include disconnecting a communication request at the second instance of the second communication application 224. For example, disconnecting the communication request at the second instance of the second communication application 224 can include denying, sending to a messaging protocol, delaying, or otherwise preventing communication utilizing the second instance of the second communication application 224.

The central communication management computing module 230, further in response to receiving the notification, identifies, from the database 232, computer-implemented actions. Specifically, the central communication management computing module 230 identifies, from the database 232, a particular computer-implemented action that is associated with (corresponding with) the second communication application. For example, the central communication management computing module 230 can identify, from the database 232, a particular computer-implemented action of updating a state for the second communication application in view of the notification, including setting the status of the second instance of the second communication application 224 to a "busy" status.

The central communication management computing module 230, in response to receiving the notification, provides the particular computer-implemented action to the second local communication management module 220, at 334. The second local communication management computing module 230 can perform the particular computer-implemented action at the second instance of the second communication application 224, at 336. Specifically, the second local communication management computing module 220 performs the particular computer-implemented action at the second instance of the second communication application 224, including updating the state of the second instance of the second communication application 224. For example, the second local communication management computing module 220 updates the state for the second communication application in view of the notification, including setting the status of the second instance of the second communication application 224 to a "busy" status.

In a use case example, a user of the first information handling system 202 can be engaged with the first instance of the first communication application 212—e.g., in a meeting utilizing the first instance of the first communication application 212. The first local communication management computing module 210 can facilitate updating the status of the first instance of the second communication application 214 to a "busy" status in response to engagement by the user with the first instance of the first communication application 212. Further, the first local communication management computing module 210 can provide a notification of such meeting to the central communication management computing module 230, which in turn facilitates the second local communication management computing module 220 to update the status of the second instance of the second communication application 224 to the "busy" status in response to engagement by the user with the first instance of the first communication application 212.

In some further examples, the first instance of the first communication application 212 can provide an additional notification to the first local communication management module 210 indicating a cessation of the meeting event associated with the first instance of the first communication application 212. The first local communication management computing module 210 can receive the additional notification from the first communication application 212. The first local communication management computing module 210, in response to receiving the additional notification, can perform an additional particular computer-implemented action at the first instance of the second communication application 214, including updating the state of the first instance of the second communication application 214. For example, the first local communication management computing module 210 updates the state for the second communication application in view of the additional notification, including setting the status of the first instance of the second communication application 214 to a nominal state.

Figure 4:
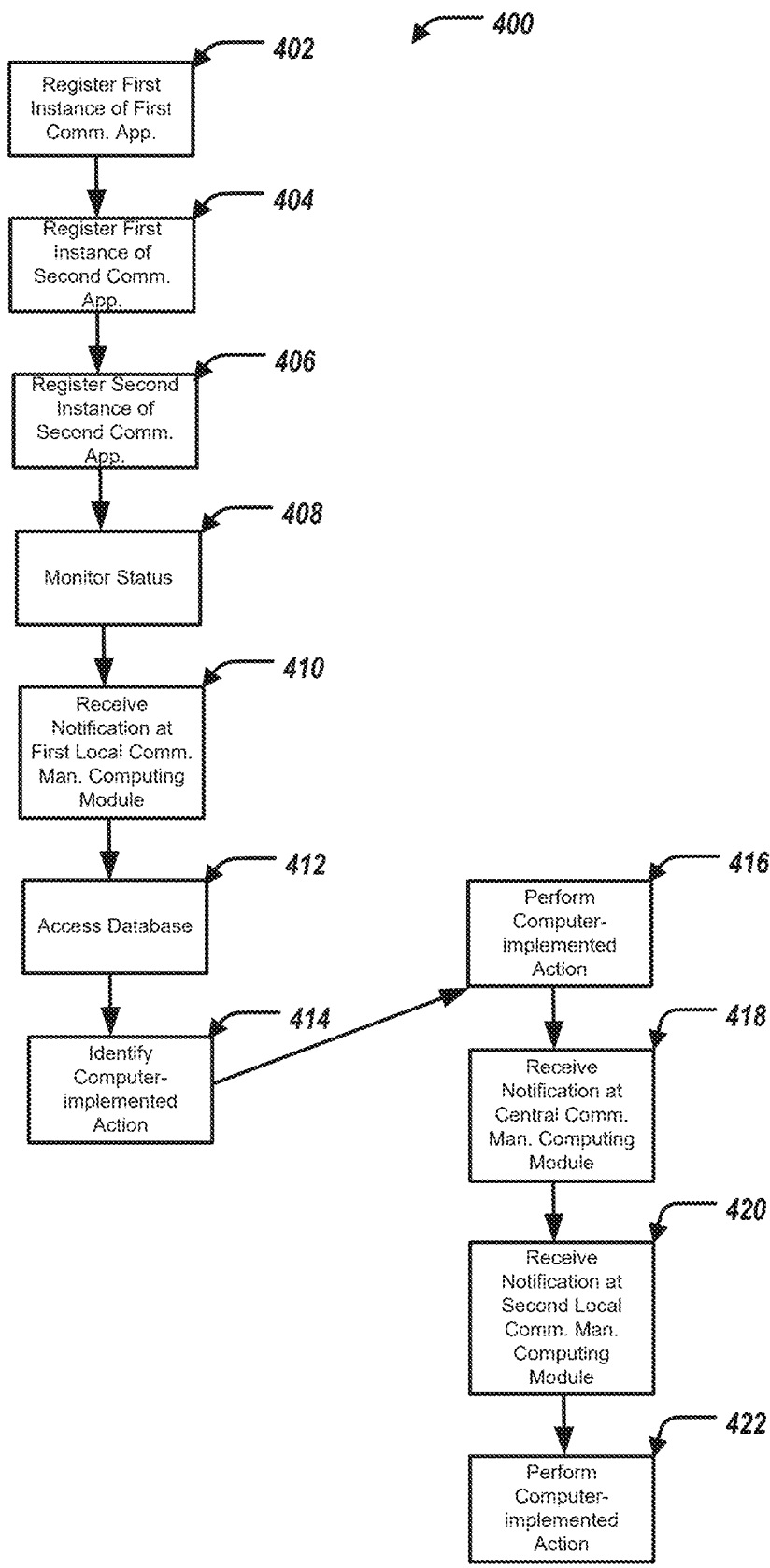
FIG. 4 illustrates a method for synchronizing communication applications within an information handling system, and between information handling systems.

FIG. 4 illustrates a flowchart depicting selected elements of an embodiment of a method 400 for synchronizing communication applications within an information handling system, and between information handling systems. The method 400 may be performed by the information handling system 100, the first information handling system 202, the second information handling system 204, and/or the central information handling system 206, and with reference to FIGS. 1-2. It is noted that certain operations described in method 400 may be optional or may be rearranged in different embodiments.

The first instance of the first communication application 212 registers with the first local communication management computing module 210, at 402. The first instance of the second communication application 214 registers with the first local communication management computing module 210, at 404. The second instance of the second communication application 224 registers with the second local communication management computing module 210, at 406. The first local communication management computing module 210 monitors a status of the first instance of the first communication application 212 and a status of the first instance of the second communication application 214, at 408. The first local communication management computing module 210 can receive a notification from the first communication application 212 indicating the meeting event associated with the first instance of the first communication application 212, at 410. The first local communication management computing module 210, in response to receiving the notification, accesses the database 218, at 412. The first local communication management computing module 210, further in response to receiving the notification, identifies, from the database 218, computer-implemented actions, at 414. The first local communication management computing module 210, further in response to receiving the notification, can perform the particular computer-implemented action at the first instance of the second communication application 214, at 416. The central communication management computing module 230 can receive the notification from the first local communication management computing module 210 indicating the meeting event associated with the first instance of the first communication application 212, at 418. The second location communication management computing module 220 can receive the notification from the central communication management computing module 230 indicating the meeting event associated with the first instance of the first communication application 212, at 420. Additionally, the second location communication management computing module 220 can further receive the particular computer-implemented action from the central communication management computing module 230. The second local communication management computing module 230 can perform the particular computer-implemented action at the second instance of the second communication application 224, at 422.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

What is claimed is:

1. A computer-implemented method of synchronizing communication applications, comprising:
registering a first instance of a first communication application of a first information handling system with a first local communication management computing module of the first information handling system, the first instance of the first communication application enabling communication between the first information handling system and other information handling systems;
registering a first instance of a second communication application of the first information handling system with the first local communication management module, the first instance of the second communication application enabling communication between the first information handling system and other information handling systems;
monitoring, by the local central communication management module, a status of each of the first instance of the first communication application and the first instance of the second communication application, including:
receiving, from the first instance of the first communication application and at a first time, a notification indicating a meeting event associated with the first instance of the first communication application;
in response to receiving the notification:
accessing a database that indicates, for each communication application of a plurality of communication applications, one or more computer-implemented actions that are responsive to the notification of the meeting event;
identifying, from the database and for the second communication application, a particular computer-implemented action; and
performing the particular computer-implemented action at the first instance of the second communication application including updating a state of the first instance of the second communication application.

2. The computer-implemented method of claim 1, wherein performing the particular computer-implemented action further includes updating a status of the first instance of the second communication application, the status including one or more of available, away, busy, do not disturb, offline, in a calendar event, presenting, or on a call.

3. The computer-implemented method of claim 1, wherein performing the particular computer-implemented action further includes disconnecting a communication request at the first instance of the second communication application.

4. The computer-implemented method of claim 1, further including:
receiving, from the first instance of the first communication application and at a second time after the first time, an additional notification indicating a cessation of the meeting event associated with the first instance of the first communication application; and
in response to receiving the additional notification, updating the status of the first instance of the second communication to a nominal state.

5. The computer-implemented method of claim 1, further including:
registering a second instance of the second communication application of a second information handling system with a second local communication management module at the second information handling system, the second instance of the second communication application enabling communication between the second information handling system and other information handling systems;
receiving, at a central communication management computing module of a central information handling system that is in communication with the first information handling system and the second information handling system and from the first information handling system, the notification;
in response to receiving the notification:
providing, by the central information handling system and to the second information handling system, the particular computer-implemented action; and
performing, by the second local communication management module at the second information handling system, the particular computer-implemented action at the second instance of the second communication application including updating a state of the second instance of the second communication application.

6. The computer-implemented method of claim 1, further in response to receiving the notification:
accessing the database that further indicates, for other applications, one or more additional computer-implemented actions that are responsive to the notification of the meeting event;
identifying, from the database and for an other application currently executing in the foreground of the first information handling system, an additional computer-implemented action; and
performing the additional computer-implemented action at the other application.

7. The computer-implemented method of claim 6,
wherein the other application currently executing in the foreground of the first information handling system is a video-based application,
wherein performing the additional computer-implemented action at the other application includes pausing the video-based application.

8. A computing environment, comprising:
a first information handling system comprising a processor having access to memory media storing instructions executable by the processor to perform operations, comprising:
registering a first instance of a first communication application of the first information handling system with a first local communication management computing module of the first information handling system, the first instance of the first communication application enabling communication between the first information handling system and other information handling systems;
registering a first instance of a second communication application of the first information handling system with the first local communication management module, the second communication application enabling communication between the first instance of the first information handling system and other information handling systems;
monitoring, by the local central communication management module, a status of each of the first instance of the first communication application and the first instance of the second communication application, including:

receiving, from the first instance of the first communication application and at a first time, a notification indicating a meeting event associated with the first instance of the first communication application;
in response to receiving the notification:
accessing a database that indicates, for each communication application of a plurality of communication applications, one or more computer-implemented actions that are responsive to the notification of the meeting event;
identifying, from the database and for the second communication application, a particular computer-implemented action; and
performing the particular computer-implemented action at the first instance of the second communication application including updating a state of the first instance of the second communication application.

9. The computing environment of claim 8, wherein performing the particular computer-implemented action further includes updating a status of the first instance of the second communication application, the status including one or more of available, away, busy, do not disturb, offline, in a calendar event, presenting, or on a call.

10. The computing environment of claim 8, wherein performing the particular computer-implemented action further includes disconnecting a communication request at the first instance of the second communication application.

11. The computing environment of claim 8, the operations further including:
receiving, from the first instance of the first communication application and at a second time after the first time, an additional notification indicating a cessation of the meeting event associated with the first instance of the first communication application; and
in response to receiving the additional notification, updating the status of the first instance of the second communication to a nominal state.

12. The computing environment of claim 8, further including:
a second information handling system comprising a processor having access to memory media storing instructions executable by the processor to perform operations, comprising:
registering a second instance of the first communication application of the second information handling system with a second local communication management module at the second information handling system, the second instance of the first communication application enabling communication between the second information handling system and other information handling systems;
a central information handling system comprising a processor having access to memory media storing instructions executable by the processor to perform operations, comprising:
receiving, at a central communication management computing module of the central information handling system that is in communication with the first information handling system and the second information handling system and from the first information handling system, the notification;
in response to receiving the notification:
providing, to the second instance of the second information handling system, the particular computer-implemented action; and wherein the second information handling system is further configured to perform operations:
performing, by the second local communication management module at the second information handling system, the particular computer-implemented action at the second instance of the second communication application including updating a state of the second instance of the second communication application.

13. The computing environment of claim 8, further in response to receiving the notification:
accessing the database that further indicates, for other applications, one or more additional computer-implemented actions that are responsive to the notification of the meeting event;
identifying, from the database and for an other application currently executing in the foreground of the first information handling system, an additional computer-implemented action; and
performing the additional computer-implemented action at the other application.

14. The computing environment of claim 13,
wherein the other application currently executing in the foreground of the first information handling system is a video-based application,
wherein performing the additional computer-implemented action at the other application includes pausing the video-based application.

15. A non-transitory computer-readable medium storing software comprising instructions executable by one or more computers which, upon such execution, cause the one or more computers to perform operations comprising:
registering a first instance of a first communication application of a first information handling system with a first local communication management computing module of the first information handling system, the first instance of the first communication application enabling communication between the first information handling system and other information handling systems;
registering a first instance of a second communication application of the first information handling system with the first local communication management module, the first instance of the second communication application enabling communication between the first information handling system and other information handling systems;
monitoring, by the local central communication management module, a status of each of the first instance of the first communication application and the first instance of the second communication application, including:
receiving, from the first instance of the first communication application and at a first time, a notification indicating a meeting event associated with the first instance of the first communication application;
in response to receiving the notification:
accessing a database that indicates, for each communication application of a plurality of communication applications, one or more computer-implemented actions that are responsive to the notification of the meeting event;
identifying, from the database and for the second communication application, a particular computer-implemented action; and
performing the particular computer-implemented action at the first instance of the second communication application including updating a state of the first instance of the second communication application.

16. The non-transitory computer-readable medium of claim 15, wherein performing the particular computer-implemented action further includes updating a status of the first instance of the second communication application, the status including one or more of available, away, busy, do not disturb, offline, in a calendar event, presenting, or on a call.

17. The non-transitory computer-readable medium of claim 15, wherein performing the particular computer-implemented action further includes disconnecting a communication request at the first instance of the second communication application.

18. The non-transitory computer-readable medium of claim 15, the operations further including:
receiving, from the first communication application and at a second time after the first time, an additional notification indicating a cessation of the meeting event associated with the first instance of the first communication application; and
in response to receiving the additional notification, updating the status of the second communication to a nominal state.

19. The non-transitory computer-readable medium of claim 15, the operations further including:
registering a second instance of the first communication application of a second information handling system with a second local communication management module at the second information handling system, the second instance of the first communication application enabling communication between the second information handling system and other information handling systems;
receiving, at a central communication management computing module of a central information handling system that is in communication with the first information handling system and the second information handling system and from the first information handling system, the notification;
in response to receiving the notification:
providing, by the central information handling system and to the second information handling system, the particular computer-implemented action; and
performing, by the second local communication management module at the second information handling system, the particular computer-implemented action at the second instance of the second communication application including updating a state of the second instance of the second communication application.

20. The non-transitory computer-readable medium of claim 15, further in response to receiving the notification:
accessing the database that further indicates, for other applications, one or more additional computer-implemented actions that are responsive to the notification of the meeting event;
identifying, from the database and for an other application currently executing in the foreground of the first information handling system, an additional computer-implemented action; and
performing the additional computer-implemented action at the other application.

\* \* \* \* \*